United States Patent [19]

Gordon et al.

[11] Patent Number: 5,425,081

[45] Date of Patent: Jun. 13, 1995

[54] FACSIMILE ARRANGEMENT

[75] Inventors: Alastair T. Gordon; Michael H. Reichmann, both of Toronto, Canada

[73] Assignee: Alphanet Telecom Inc., Toronto, Canada

[21] Appl. No.: 823,455

[22] Filed: Jan. 22, 1992

[51] Int. Cl.⁶ .......................................... H04M 11/00
[52] U.S. Cl. ...................................... 379/100; 379/93
[58] Field of Search ................. 379/100, 95, 93, 96, 379/97, 98, 199, 200, 233; 358/86, 400, 468

[56] References Cited

U.S. PATENT DOCUMENTS

| | | | |
|---|---|---|---|
| 4,935,955 | 6/1990 | Neudorfer | 379/100 |
| 4,969,184 | 11/1990 | Gordon et al. | 379/100 |
| 4,994,926 | 2/1991 | Gordon et al. | 379/100 |
| 5,062,134 | 10/1991 | Laird | 379/199 |
| 5,077,607 | 12/1991 | Johnson et al. | 358/86 |

FOREIGN PATENT DOCUMENTS 0360732 3/1990 European Pat. Off. .
3230609 4/1984 Germany .

OTHER PUBLICATIONS

Ericsson Review, vol. 61, No. 1, Dec. 31, 1984, Stockholm (SE), pp. 51–58, R. Dietsch "Hotel Communication System".
The article "SR100 PBX", Nov. 1987, p. 17.

*Primary Examiner*—Curtis Kuntz
*Assistant Examiner*—Jason Chan

[57] ABSTRACT

A system, according to the present invention, provides temporary facsimile services to facsimile machines provided in hotel rooms. The system includes an intermediary having a host of direct in-dial telephone numbers which can be selectively activated and assigned to any one facsimile machine of a plurality of facsimile machines. The facsimile machines can be selectively authorized by assigning thereto for a temporary period a direct in-dial telephone number from the host of direct in-dial numbers of the intermediary. The intermediary activates the direct in-dial number whereafter the authorized facsimile machine is capable of receiving transmissions sent to the direct in-dial telephone number via the intermediary. The system maintains the direct in-dial number activated until the expiry of the temporary period and thereafter deactivates the direct in-dial number. The direct in-dial number is maintained deactivated for a down period of time whereby any facsimile transmissions sent to the direct in-dial number during the down period of time is not received. In this way, provision is made not to receive any transmissions to the direct in-dial number during any down period whereby the guest is ensured transmissions destined for the particular guest are not received immediately after his departure from the hotel.

19 Claims, 6 Drawing Sheets

FACSIMILE ARRANGEMENT

FIELD OF THE INVENTION

The present invention relates to providing facsimile services to each of a host of locations each controlled by a PBX system.

BACKGROUND OF THE INVENTION

A number of telephone communication services have been proposed and are disclosed in U.S. Pat. No. 4,713,837, No. 4,905,273, No. 4,922,518, No. 4,942,599, and No. 4,969,184, which are incorporated herein by reference.

Hotels have recognized the desire of some guests to receive or have available to them facsimile services whereby they can transmit and receive documents. Many hotels now have a business area which will transmit and receive documents for guests. However, the level of this service is certainly well below that normally experienced by the guest who would have his own dedicated facsimile machine. Some hotels have provided a facsimile transmitting booth in a common area of the hotel. However, again, although this provides the user with some privacy with respect to the transmission of documents, it is not particularly convenient with respect to the receipt of documents. Any receipt of documents must be prearranged such that the user is at the particular facsimile booth at the time the document is received.

A further problem in providing adequate facsimile services to hotels is the existing telephone wiring within the hotels which generally do not have the capacity to have a dedicated facsimile machine in each hotel room. Furthermore, the hotel PBX system is typically answered by an operator whereby any facsimile transmissions are initially received by the operator and thus, normal facsimile transmission is not possible.

There remains a need to provide a simple, effective facsimile service for establishments having a PBX system which service does not require rewiring of the property and which does not compromise the privacy and security of the user.

SUMMARY OF THE INVENTION

A system for providing temporary facsimile services to facsimile machines, located in an establishment having a PBX system, comprises an intermediary having a host of direct in-dial telephone numbers which can be selectively activated and assigned to any one of a host of facsimile machines. Each facsimile machine can be selectively authorized by assigning thereto for a temporary period a direct in-dial telephone number from the host of direct in-dial telephone numbers of the intermediary, with the intermediary activating the direct in-dial number whereafter the authorized facsimile machine is capable of receiving facsimile transmissions sent to the direct in-dial telephone number via the intermediary. The direct in-dial number is maintained activated until the expiry of a temporary period determined by the guest or establishment. When the direct in-dial number is deactivated after the temporary period, it is maintained out of the direct in-dial numbers assigned to facsimile machines for a down period of time whereby any facsimile transmissions sent to the direct in-dial telephone number during the down period of time is not received. This procedure, when applied to facsimile machines in separate rooms of a hotel, assures that a document transmitted by facsimile machine to a guest in a hotel room after that guest has checked out of the room will not be received by the next guest in that room, as would be the case if the facsimile number was permanently assigned to the machine.

According to an aspect of the invention, the facsimile machine, or a device attached thereto, is capable of receiving a non-telephone communication which communicates to the machine, or the device attached thereto, that a facsimile has been received for the particular direct in-dial number assigned thereto, whereafter the facsimile machine, or a device attached thereto, places an outgoing call and contacts an intermediary to receive the particular facsimile transmission.

According to a further aspect of the invention, the facsimile machines are located in hotels, and each facsimile machine is also used as a remote printer for the hotel whereby particular transmissions can be sent to any of the facsimile machines as determined by the hotel.

According to a further aspect of the invention, a system for delivery of a folio upon demand by a guest or initiated by the hotel is proposed where the system comprises a facsimile machine provided in the respective guest's hotel room, with each facsimile machine having a separate address and a facsimile transmitter associated with the hotel accounting function by means of which facsimiles of the folio data for the individual guest is sent to the respective facsimile machine when authorized by the guest or in accordance with a predetermined arrangement. In this manner, a guest may receive a hard copy of his folio in the hotel room without dealing with the front desk clerks. In this way, automatic check-out is possible where the guest receives a hard copy of his actual folio in his hotel room. This arrangement is advantageous to the guest as well as to the hotel, as the hotel front desk, under traditional arrangements, requires high manpower during the normal check-out times of 6:30 a.m. to 9:30 a.m., often for the sole purpose of accommodating guests wishing to check out who require a hard copy of their actual folio.

BRIEF DESCRIPTION OF THE DRAWINGS

Preferred embodiments of the invention are shown in the drawings, wherein.

DETAILED DESCRIPTION OF THE PREFERRED EMBODIMENTS

One of the problems to overcome in providing personalized facsimile services in individual rooms of a hotel property involves providing a system which can operate satisfactory with the PBX system 8 of the hotel property. Such PBX systems are often operator attended and even if the PBX system is not operator attended, there is a problem getting behind the PBX and to allow two devices to share a single telephone line, with each device having its unique telephone number.

Figure 1A:
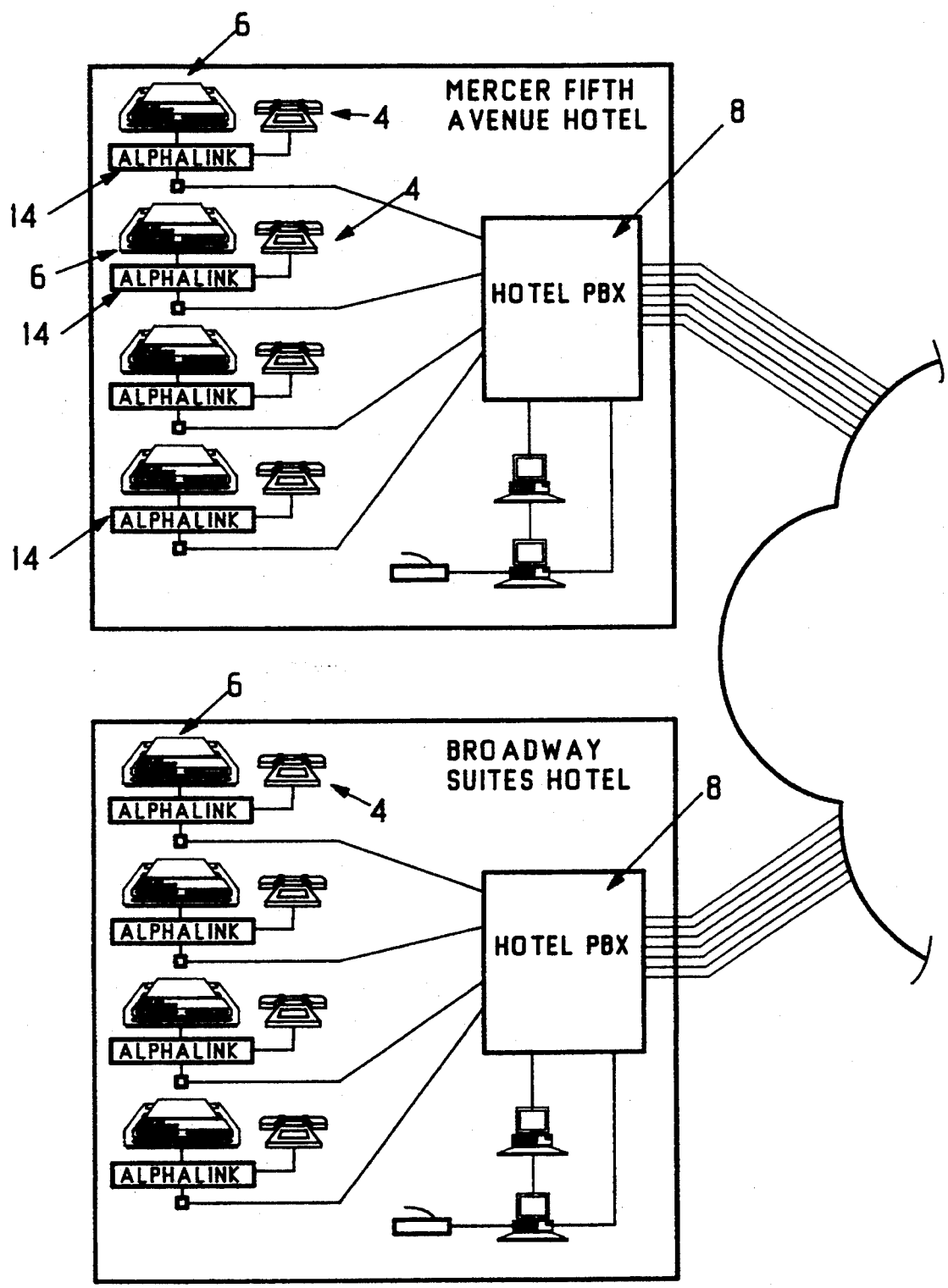
FIGS. 1A and 1B are schematics of the network architecture used for connecting facsimile machines located in hotel rooms.
Figure 1B:
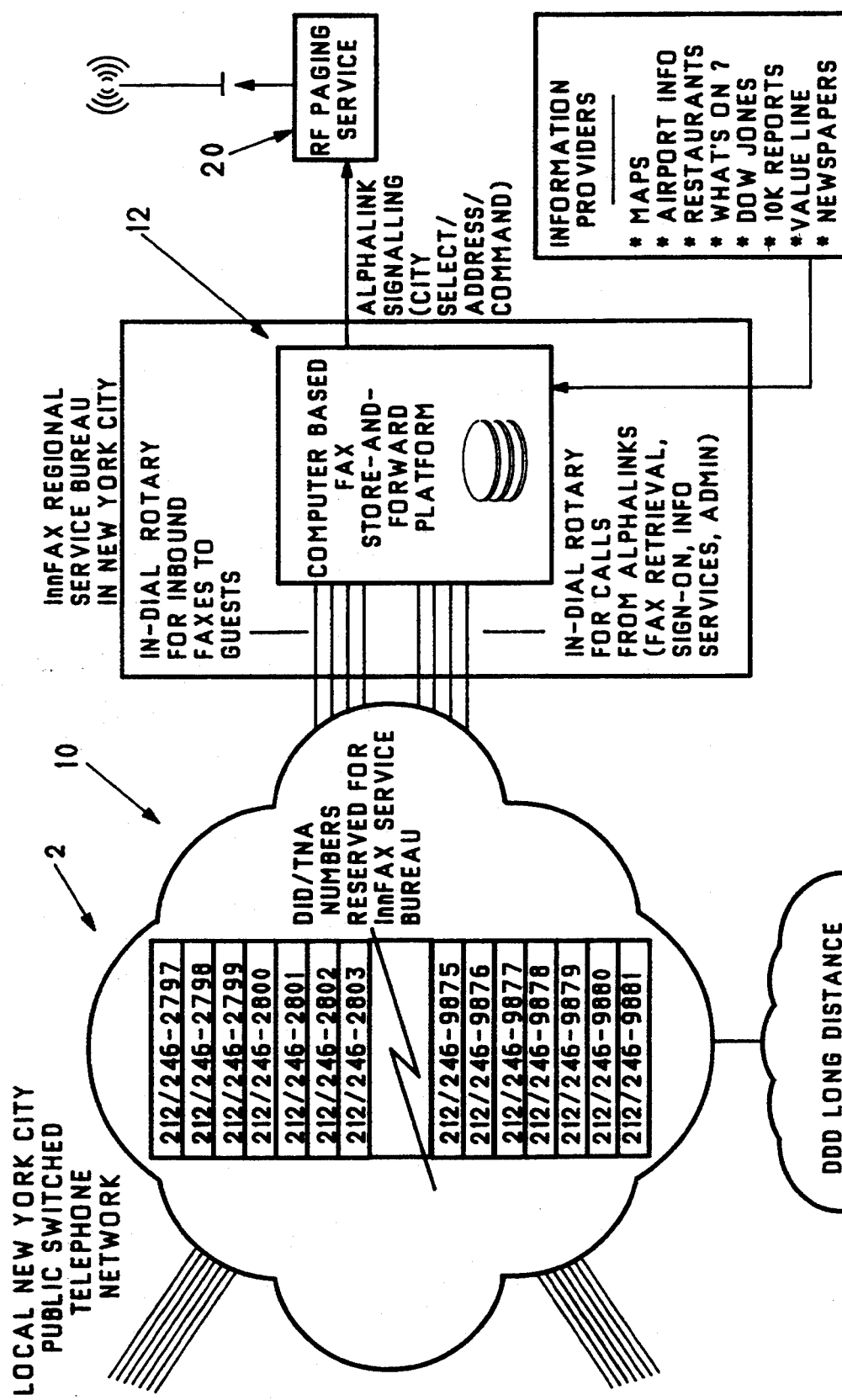

A system 2 for providing facsimile services to individual rooms of a hotel property is shown in FIG. 1. This system allows voice telephones 4 to use the number assigned to the line to which it is connected in the conventional manner. The other device, the facsimile machine 6, has a different number, one which is assigned by the intermediary 12 from a host of direct in-dial numbers provided by 10 in this case which is part of a local public switched telephone network. This number, when called from any remote facsimile machine, will result in a document being delivered to the machine temporarily associated with said number by 12, as if the machine had its own dedicated telephone line. The facsimile machine has also been provided with a separate means for activating the facsimile machine which is based on a non-telephone signal. This approach allows calls for the automatic delivery of documents to the facsimile machine in the hotel room even though all inbound calls to the hotel are otherwise intercepted by a human operator at the PBX system 8 of the hotel. The process intermediary may be configured to serve one or more hotel properties and may or may not be located within the hotel property.

Figure 4A:
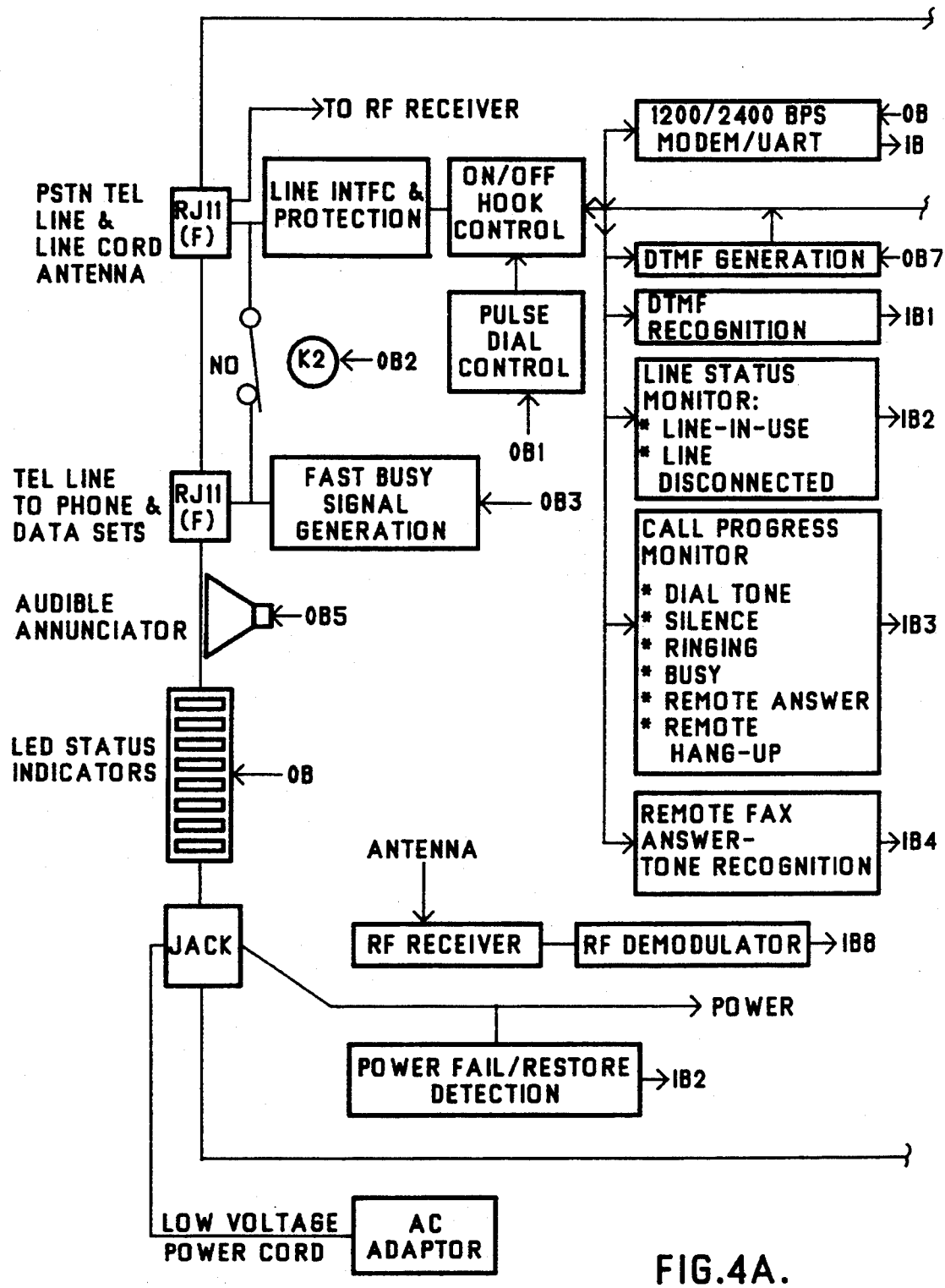
FIGS. 4A and 4B are schematics of a link member associated with the facsimile machine which modifies how the facsimile machine receives and transmits facsimile documents.
Figure 4B:
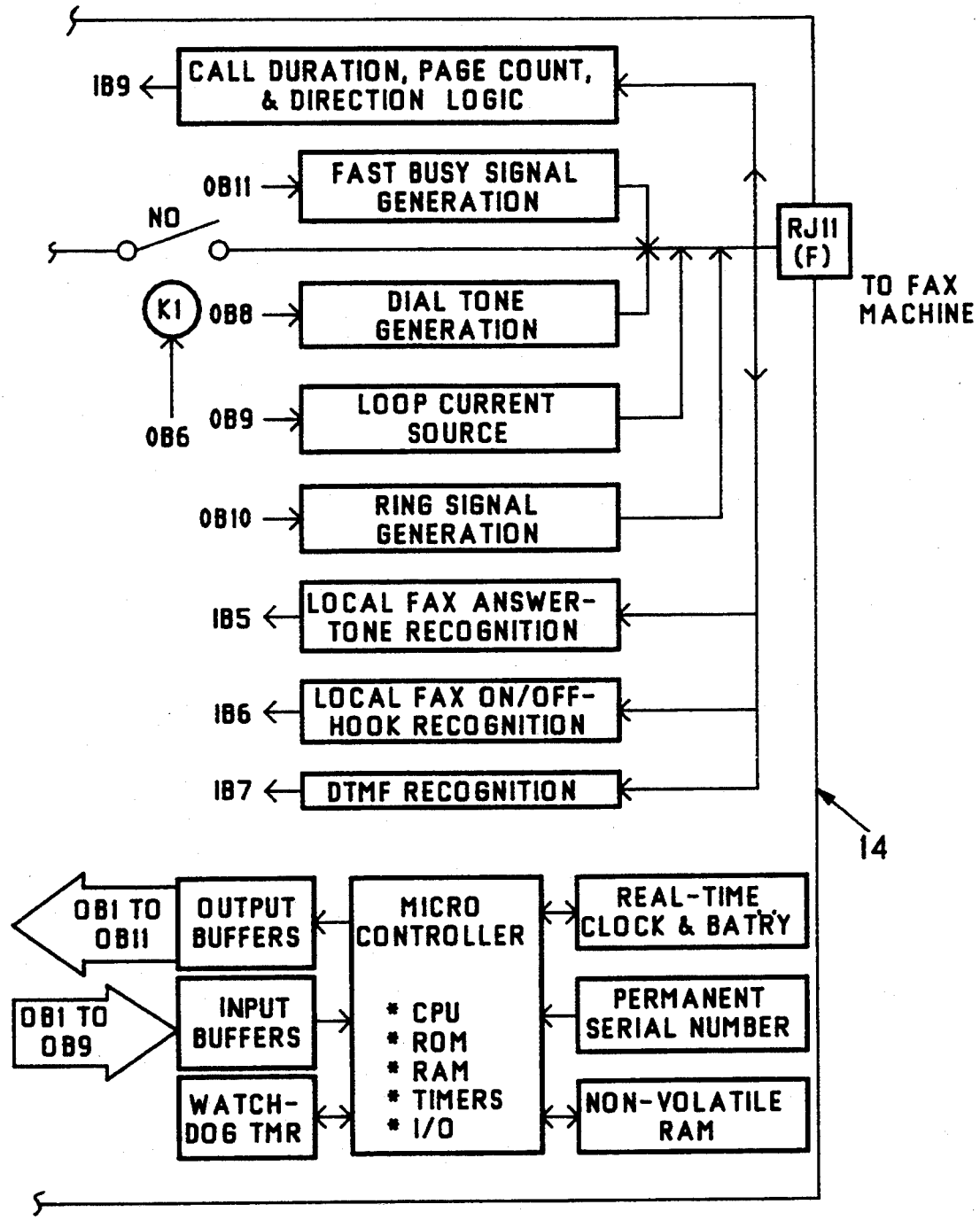

The operation of the system will be explained with respect to a particular example. A sender in a particular area dials a telephone number which has been assigned to a particular facsimile machine on a temporary basis in a hotel. This number, for example, is 212-424-2800. The sender, upon dialing this number, hears a facsimile tone and transmits his document in the normal manner. In actual fact, the sender has not dialed an actual facsimile machine, instead he has dialed a facsimile port on the Computer Based Service Bureau and has reached the port via the standard DID class of telephone service. DID services are offered by telephone companies to cellular operators, paging services, answering services, and other service providers who need to distribute telephone numbers of their customers for other than conventional telephone service. The facsimile port at the intermediary, having answered the call, is first informed by the local telephone switch of the actual number dialed. Having determined the called number is active, the intermediary accepts the facsimile and stores it on the computer based facsimile store-and-forward platform, generally indicated as 12. The intended recipient's facsimile machine is sharing a line with one of the telephones 4 and, according to the normal manner of placing calls to specific hotel rooms, it is generally impossible to directly contact the hotel room, as the call is interrupted by a human operator. To overcome this problem, the Service Bureau sends a signal to the recipient's machine, or a device attached thereto, which is a non-telephone signal and which, when received by the particular facsimile machine, or a device attached thereto, causes the facsimile machine, or a device attached thereto, to call into the Bureau and retrieve the facsimile. This approach is transparent to both the sender and recipient. Preferably, this is accomplished using radio frequency paging. The link 14 associated with each facsimile machine 6 connects the facsimile machine and the telephone outlet and contains a unique RF address similar to a conventional mobile pager. When a facsimile is received for a particular hotel guest, the intermediary automatically identifies the RF address of the recipient's link member 14 and issues a paging signal at 20 in the particular region which contains the link member's unique address. The link member, having been paged, automatically dials into the Service Bureau using a local or toll-free 1-800 number and identifies itself. The link member then rings the facsimile machine, making the unit ready to receive a transmission. The link member is now connected to both the Service Bureau and to the facsimile machine thereby allowing the Service Bureau to deliver the facsimile to the recipient's machine in his hotel room. Details of the link are shown in FIG. 4.

This approach takes advantage of standard paging services in order to provide signalling in a reliable and cost effective manner. Thus, there is no need to create a separate RF paging infrastructure, yet the system enjoys the highly reliable and low-cost service from a number of existing and well established service providers. Furthermore, the facsimile transmission arrangement to the sender and the receiver appears to the users to be conventional and, in fact, the only major difference is the fact that a small delay has been imposed between sending and receiving. There are some advantages in that multiple facsimile transmissions can be received by the intermediary destined for one particular facsimile machine without incurring a busy signal. It can be appreciated that the intermediary can merely record these messages to disk and then forward them on to the intended party in the manner described above or in another manner.

Figure 2:
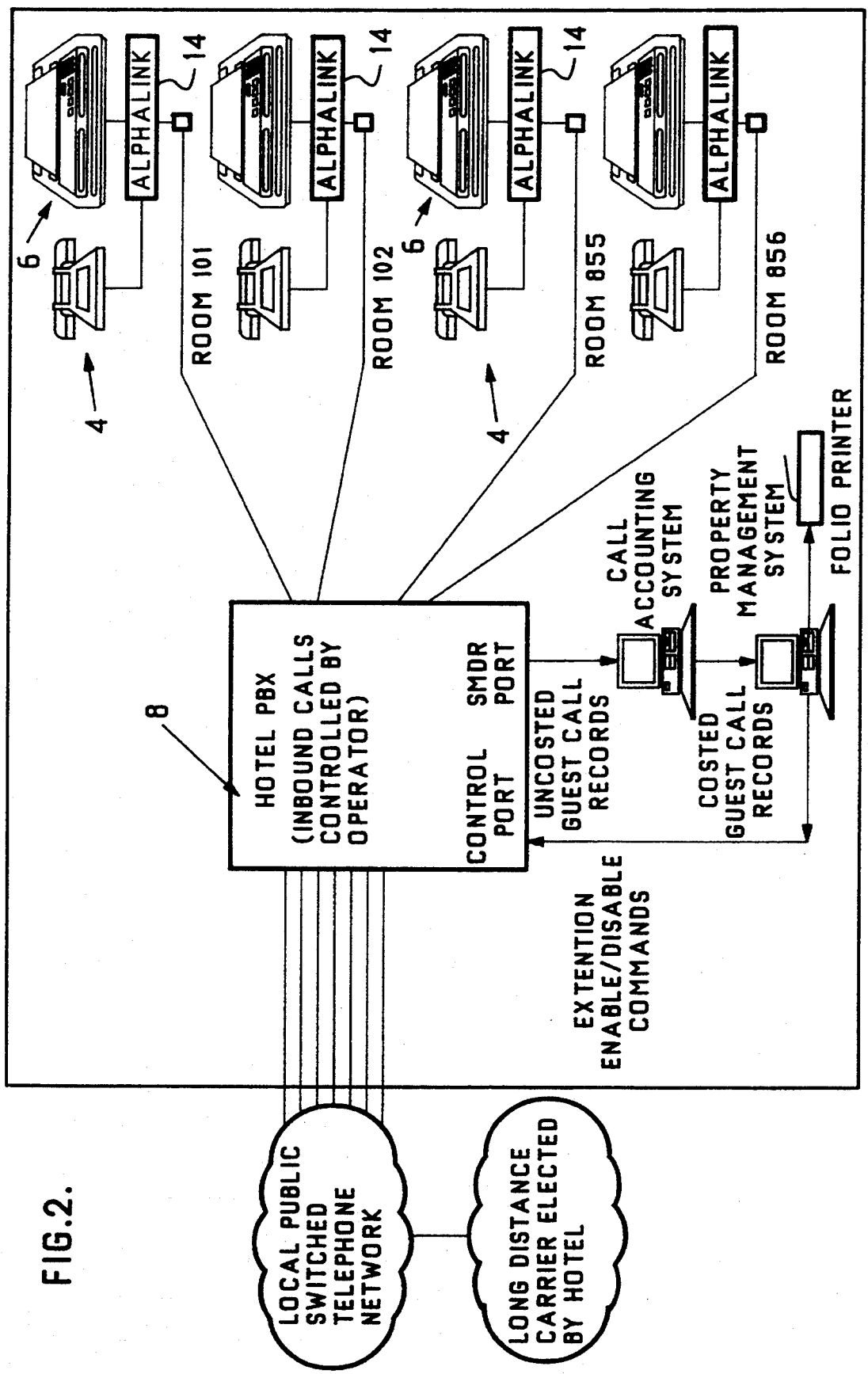
FIG. 2 is an enlarged view of one hotel installation showing the individual facsimile machines communicate with the hotel PBX system and the local public switched telephone network.
Figure 3:
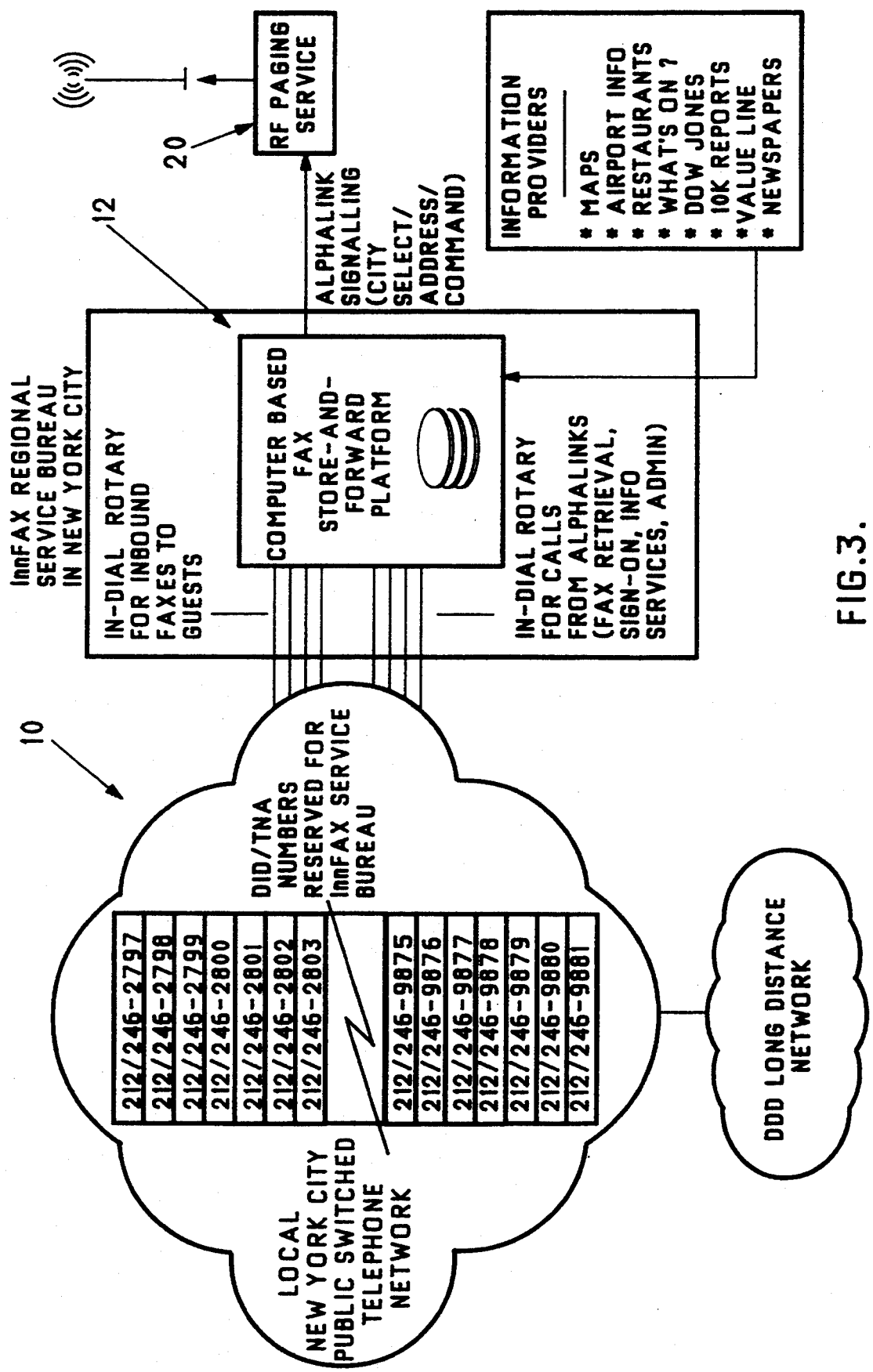
FIG. 3 is a view showing details of the local public switched telephone network having a store and forward facsimile capability associated with a host of direct in-dial numbers.

With respect to sending a facsimile, the guest simply dials the number of the intended recipient and feeds his document into the machine. It is possible for the link member to monitor the transmission and maintain a record of the duration of the call. This can be used for billing purposes. The link is positioned between the facsimile machine and the telephone line and it inserts its own unique access code at the beginning of the dialing sequence. This access code can be a particular code, such as the number 5, to allow determination by the hotel PBX system of different types of telephone functions. Therefore, the guest dialed, for example, the number 1-619-744-0962, the alpha link would then go off hook to the hotel's telephone system (PBX) and would dial 5-1-619-744-0962. The hotel's PBX would be configured to use the same out-dial trunk group for an access code of 5 as it does for an access code of 9, for example, a typical access code for a non-operator-assisted outgoing call. This insertion of the access code is transparent to the guest placing the call. With this arrangement, the hotel's PBX system transmits an uncosted billing report from its station message detailed report which is used to monitor existing telephone costs. Thus, the hotel can use its existing call accounting system (see FIG. 2) to keep track of facsimile transmissions. This uncosted station message detailed report typically contains the following fields: date, time, extension (room) number, access code, digits dialed by the guest, duration of a call, trunk number used by the PBX to dial out, and account codes (if any). This record is transmitted to the Call Accounting System which is connected to the station message detail report port of the PBX. The Call Accounting System accepts the uncosted billing record and applies the appropriate charges based on the access code, the number dialed and the duration of the call. Separate charges can be accorded for facsimile transmissions due to the unique access code assigned to facsimile machines and inserted by the link member. Similarly, if desired, a charge can be allocated for receiving of transmissions, in that the link member has effected an outgoing call to a particular number of the intermediary and the Call Accounting System can track this and apply the appropriate charges. In this way, the hotel can charge for facsimile traffic to or from the hotel and make appropriate charges for the provision of facsimile services.

The hotel may also use the individual facsimile machines 6 as remote printers. The link members 14 can also monitor signals originated by the PBX and sent to the particular telephone extension. In this manner, the hotel can activate a facsimile machine and allow a transmission originating by the hotel to be sent to that facsimile machine. This would be useful to provide the guest with a hard copy of his folio which lists the various charges he has incurred to date. Similarly, messaging services can be provided directly to the facsimile machine. It is possible to have the hotel transmit to a particular facsimile machine via the intermediary 12. In this case, the hotel might merely identify a particular address, i.e. room number, of the guest who is to receive the transmission and the intermediary would then link this room number with a DID number assigned to that facsimile machine and then transmit the facsimile to the particular facsimile machine in the manner described. In some cases, it may be desirable for the hotel to operate independently of the intermediary for activating the facsimile machine as a remote printer. It can also be appreciated that the user could key in certain codes to the facsimile machine which would alert the hotel PBX and computer system to provide the user with particular information. This could include the guest's folio or particular information which the guest desires and which the hotel has available. This could include messages as well as general information regarding what services are available or other information specifically requested by the guest.

From the above, it can be seen that the facsimile machine can be provided in individual rooms of a hotel and effectively work behind a hotel PBX system and send and receive facsimile transmissions. In order to ensure privacy of messages, the direct in-dial number, upon a hotel guest checking out, would be discontinued for a specified down time, such that facsimile transmissions are no longer received by the intermediary 10. The intermediary can provide a voice feedback to the sending facsimile machine, if desired, stating that the guest has checked out. After a certain down period, the particular DID number can then be returned to service. Therefore, there is a certain down period after the person has checked out where the DID number is no longer in use.

It can be appreciated from the above that even if the guest does not require facsimile services, the facsimile machine can still be used to provide superior service to the guest by providing the guest with a hard copy of his folio at any time, including check out. In most cases, the guest is capable of checking out and merely having the bill forwarded to him, but is reluctant to leave the property without a hard copy of his account. The use of the facsimile machine as a remote printer which can be activated in the manner described above or it can be activated directly by the hotel via the link member 14 using a signal sent on the telephone line or an RF signal activating the link. Therefore, the provision of a facsimile machine, even if not used, can simplify checkout, reducing the problems at the front desk and providing more personal service to the guest.

From the above, it is apparent that temporary assignment of the direct in-dial number to a facsimile machine could take place anywhere, for example, within the remote service bureau, or within equipment located in the hotel property, or within the hotel PBX itself.

The dynamic rotation of direct in-dial numbers, such that assigned numbers after termination of the facsimile service are not immediately reassigned, overcomes many potential problems associated with the receipt of facsimiles to non-authorized parties. This arrangement is easy to implement and is cost effective. Furthermore, the dynamic rotation can be used in any arrangement where direct in-dial numbers are temporarily assigned to facsimile machines in particular, or other recording equipment and the like. The number of direct in-dial numbers is of a magnitude significantly greater than the number of facsimile machines to provide for effective dynamic rotation.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a facsimile system having a host of facsimile machines connected to a public switched telephone network by an intermediary, said intermediary allowing said facsimile machines to initiate and automatically complete telephone communications with the publicly switched telephone network, but does not allow automatic connection of any of the facsimile machines with an originating facsimile machine separate therefrom by said intermediary and said public switched telephone network, a method of authorizing and activating any of said facsimile machines for receiving and transmitting of facsimile transmissions comprising the steps of assigning to each respective facsimile machine to be authorized and activated a particular direct in-dial telephone number address from a host of direct in-dial number addresses for a temporary actuation period and, after expiry of the temporary actuation period, removing the assignment of the direct in-dial number address from the respective facsimile machine and maintaining the direct in-dial number address inactive for a further period of time whereby facsimile transmissions sent to any assigned directed in-dial number address which has been removed are not received by any of the facsimile machines during the further period; and providing a computer which is connected to the public switched telephone network which receives and temporarily stores any facsimile transmissions which use the direct in-dial telephone number address of an activated facsimile machine, which facsimile transmissions can be received by the respective facsimile machine by said respective facsimile machine initiating a telephone facsimile communication with the computer.

2. In the method as claimed in claim 1 wherein the step of assigning a particular telephone address from the host of direct in-dial number addresses is such that the host of direct in-dial number addresses is of a magnitude significantly greater than the number of said facsimile machines at one time which are assigned said direct in-dial number addresses and wherein said direct in-dial number addresses are dynamically rotated to increase the duration of the further period of time.

3. A system for providing, for a temporary period, facsimile service to individual facsimile arrangements comprising a multiplicity of facsimile arrangements, each having their own non-telephone address uniquely identifying each of said facsimile arrangements, each of said facsimile arrangements being separated from a publicity switched telephone network by a processor which does not allow incoming facsimile transmissions to be automatically received by the facsimile arrangement to which the facsimile transmission is destined while allowing automatic transmission of facsimile transmissions from any of said facsimile arrangements to the public switched telephone network via the processor; said system further including an intermediary having a host of direct in-dial telephone numbers where each of said direct in-dial telephone numbers can be selectively activated and assigned to one facsimile arrangement of said multiplicity of facsimile arrangements, means for selectively authorizing and activating any of the facsimile arrangements by assigning thereto, for a temporary period, a direct in-dial telephone number from the host of direct in-dial numbers of the intermediary with the intermediary activating the direct in-dial number whereafter a authorized facsimile arrangement can receive facsimile transmissions sent to the direct in-dial telephone number via the intermediary when the facsimile arrangement initiates a telephone communication with said intermediary, means for establishing a telephone communication between the intermediary and a particular facsimile arrangement, initiated by the particular facsimile arrangement, when a facsimile transmission has been received by the intermediary for the particular facsimile arrangement identified by the direct in-dial number, maintaining the direct in-dial number activated until the expiry of the temporary period, and deactivating the direct in-dial number after the temporary period and maintaining the direct in-dial number deactivated for a down period of time such that any facsimile transmissions sent to the direct in-dial telephone number during the down period of time is not received.

4. A system as claimed in claim 3 wherein each of said facsimile arrangements has been programmed to have an actuator for completing a communication with said intermediary, which communication includes the non-telephone address of the particular facsimile machine and is used by the intermediary to determine whether the facsimile arrangement should be authorized and activated.

5. A system as claimed in claim 4 wherein said processor is a hotel telephone system processor and said intermediary also receives authorizing communications which include details of said facsimile arrangements which are authorized and activated for facsimile services at particular points in time.

6. A system as claimed in claim 3 wherein said processor is a hotel computer which provides the intermediary with the non-telephone address of each of the facsimile arrangements to be authorized and activated for facsimile services at given points in time.

7. A system as claimed in claim 6 wherein said intermediary after authorizing and activating one of the facsimile arrangements for facsimile service produces a transmission for the one facsimile arrangement informing the user of said one facsimile arrangement of the particular direct in-dial number assigned thereto and causes said one facsimile arrangement to retrieve the produced transmission.

8. A system as claimed in claim 3 wherein each of said facsimile arrangement has associated therewith a separate receiver means for receiving and identifying non telephone communications from the intermediary indicating a facsimile transmission has been received by the intermediary which transmission is destined for the facsimile arrangement, and said intermediary transmits non telephone communications addressed to the facsimile arrangement by means of its non telephone address when a transmission is received for the facsimile arrangement and the facsimile arrangement is authorized.

9. A system as claimed in claim 3 wherein a hotel computer, upon request, sends a facsimile transmission to a particular facsimile arrangement which facsimile transmission is an itemized account of the folio of the guest renting a room in which the particular facsimile arrangements is located.

10. A system as claimed in claim 9 wherein each of said facsimile arrangements has a plurality of speed dialing numbers and one of the speed dialing numbers is used to request of the hotel the guest's folio to be transmitted to the facsimile arrangement.

11. A system as claimed in claim 3 wherein each of said facsimile arrangements includes means for automatically including in any transmission originating at the facsimile arrangement a facsimile code for the processor indicating that the transmission is a facsimile transmission.

12. A system as claimed in claim 11 wherein the processor includes a call accounting system by means of which telephone charges are determined and wherein said call accounting system identifies facsimile transmissions and allocates a separate charge therefor.

13. A system as claimed in claim 11 wherein each of said facsimile arrangements has a separate non-telephone activating signal by means of which said intermediary indicates a facsimile transmission is destined therefor, and wherein each of said facsimile arrangements upon being activated by said non-telephone signal, places an outgoing call to the intermediary, identifies itself to the intermediary and then receives the destined facsimile transmission.

14. A delivery system for delivery upon demand of hotel guests folios via a hotel telephone system, said delivery system comprising a facsimile arrangement provided in each respective guest's hotel room with each facsimile arrangement having a separate address; and a facsimile transmitter associated with an accounting system of the hotel which tracks and maintains the folio's of each guest, said facsimile transmitter co-operating with said accounting system to transmit using the hotel telephone system, a facsimile of the individual guest's folio to their respective facsimile arrangement when authorized by the guest or by the hotel; and wherein each facsimile arrangement includes an actuation key for indicating to said delivery system the respective guest's folio is requested.

15. A system comprising, in combination, an establishment having a separate telephone system which serves a host of separately identified telephone outlets in various locations which can be temporarily rented, said separate telephone system controlling which of said telephone outlets can be connected to a Public Switched Telephone Network, each of said telephone outlets having a facsimile arrangement connected thereto, said telephone outlets cooperating with said separate telephone system and identifying particular telephone transmissions by introducing therein a code which is used by the separate telephone system to complete the transmission, a plurality of separately identified addresses and each facsimile arrangement being assigned one of said addresses, which addresses are maintained whether said facsimile arrangements are in an authorized or non-authorized mode, a controller associated with said separate telephone system and said facsimile arrangements to authorize and activate a facsimile arrangement by temporarily assigning to any facsimile arrangement a personal direct in-dial telephone number from a host of direct in-dial telephone numbers and associating each temporary personal direct in-dial number with the particular address of the facsimile arrangement, said controller when authorized sending to any authorized facsimile arrangement identified by the particular separately identified address, a folio of charges incurred by a user of the location who requested authorization and activation of the particular facsimile machine.

16. A system for sending transmissions to facsimile machines in a commercial establishment which rents rooms on a temporary basis comprising a separate telephone system connected to existing telephone outlets in rooms with each outlet having connected thereto a facsimile machine arrangement capable of placing outgoing calls via the separate telephone system, each facsimile machine requiring a separate authorization and activation arrangement to be capable of receiving facsimile transmissions originating from a source other than the commercial establishment and transmitted thereto using an assigned direct in-dial telephone number, a Public Switched Telephone Network and said separate telephone system, each of said facsimile machines being capable independently of said authorization and activation arrangement of receiving facsimile transmissions originating within said commercial establishment and directed to the particular facsimile machine by means of an address other than the direct in-dial telephone number, whereby said commercial establishment can use any of said facsimile machines as a remotely controlled printer for sending information thereto.

17. A system as claimed in claim 16 wherein said separate authorization and activation arrangement temporarily assigns for an operating period a direct in-dial number from a host of direct in-dial numbers and any assigned direct in-dial number is held in non-use for a sufficient period of time to greatly reduce the probability of receiving a transmission for a facsimile machine which had previously been assigned the direct in-dial number prior to the period of non-use after the operating period has ended, and wherein facsimile transmissions sent to direct in-dial numbers held in non-use are not received.

18. A system as claimed in claim 17 wherein each facsimile machine has a separate non-telephone address which can be transmitted to and received by the facsimile machine in a manner other than by the telephone system, and wherein each facsimile machine operates to place an outgoing call to a predetermined number upon receiving its non-telephone address via the separate telephone system and receives from a computer at the predetermined number a facsimile transmission received thereby destined for the facsimile machine identified by an assigned direct in-dial number of the host of direct in-dial numbers.

19. In a hotel phone system, a folio to room delivery arrangement comprising a host of facsimile machines with each of said facsimile machines assigned to a particular guest room and connected to the telephone system in the guest room uniquely identified and wherein each of said facsimile machines includes an activation arrangement, which when activated allows the receipt of a non-hotel related destination, each activation arrangement being activated by receipt of a separate authorization and activation signal; and wherein each of said facsimile machines receives facsimile transmissions, originating within the hotel and destined for the guest of a uniquely identified guest room, and wherein said hotel phone system includes means to transmit to any such uniquely identified guest room the guest's folio which is printed by the facsimile machine assigned to the uniquely identified guest room independent of the state of said activation arrangement.

* * * * *